US012345468B2

(12) United States Patent
Jackson

(10) Patent No.: US 12,345,468 B2
(45) Date of Patent: Jul. 1, 2025

(54) THERMAL MANAGEMENT FOR SOLAR-POWERED OFF-GRID REFRIGERATION

(71) Applicant: RADIANT INNOVATION LLC, Evergreen, CO (US)

(72) Inventor: Gregory S. Jackson, Golden, CO (US)

(73) Assignee: Radiant Innovation LLC, Evergreen, CO (US)

(*) Notice: Subject to any disclaimer, the term of this patent is extended or adjusted under 35 U.S.C. 154(b) by 446 days.

(21) Appl. No.: 17/990,094

(22) Filed: Nov. 18, 2022

(65) Prior Publication Data

US 2023/0152035 A1    May 18, 2023

Related U.S. Application Data

(60) Provisional application No. 63/280,938, filed on Nov. 18, 2021.

(51) Int. Cl.
| | |
|---|---|
| *F25D 29/00* | (2006.01) |
| *G05B 19/4155* | (2006.01) |
| *H02J 7/00* | (2006.01) |

(52) U.S. Cl.
CPC ......... *F25D 29/00* (2013.01); *G05B 19/4155* (2013.01); *H02J 7/0063* (2013.01); *G05B 2219/2654* (2013.01)

(58) Field of Classification Search
CPC ... F25D 29/00; F25D 11/003; G05B 19/4155; G05B 2219/2654; G05B 2219/37283;
(Continued)

(56) References Cited

U.S. PATENT DOCUMENTS

| | | |
|---|---|---|
| 5,917,433 A | 6/1999 | Keillor et al. |
| 6,098,893 A | 8/2000 | Berglund et al. |
| | (Continued) | |

FOREIGN PATENT DOCUMENTS

EP    2528759 B1    5/2014

OTHER PUBLICATIONS

Aldelano Solar ColdBox, https://aldelanosolarsolutions.com/solarcoldbox, 4 pp.
(Continued)

*Primary Examiner* — Chun Cao
(74) *Attorney, Agent, or Firm* — James A. Sheridan; Sheridan Law, LLC

(57) ABSTRACT

In embodiments of a thermal and environmental control system an off-grid cold-storage facility has solar photovoltaic panels for producing electricity. A battery is in operable connection with the solar photovoltaic panels and configured to store the electricity produced by the solar photovoltaic panels. Cooling equipment is in operable connection to the battery and configured to regulate the temperature of the off-grid storage facility. Ventilation equipment is in operable connection to the battery to regulate air humidity and gas concentrations. A computer processor is provided at the off-grid storage facility and is in operable connection with the cooling equipment. The computer processor is configured to provide a regulating signal to the cooling equipment for optimizing battery usage, thermal setpoint, and environmental conditions. A cloud-based computing system is in operable communication to weather data and in operable communication to the computer processor. The cloud-based computing system is configured to compute optimized battery usage, thermal setpoint, and environmental conditions of the off-grid storage facility based on the weather data.

20 Claims, 12 Drawing Sheets

(58) Field of Classification Search
CPC ............. G05B 15/00; G05B 2219/2614; H02J 7/0063; H02J 7/007188; H02J 7/35; F25B 27/00; F24F 11/49; F24F 11/65; F24F 2110/10
USPC .......................................................... 700/297
See application file for complete search history.

(56) References Cited

U.S. PATENT DOCUMENTS

| | | | |
|---|---|---|---|
| 6,240,737 | B1 | 6/2001 | Albiez |
| 6,253,563 | B1 | 7/2001 | Ewert et al. |
| 6,453,693 | B1 | 9/2002 | Ewert et al. |
| 8,353,167 | B2 | 1/2013 | McGann |
| 8,633,672 | B2 | 1/2014 | Jung et al. |
| 9,575,550 | B1 | 2/2017 | Oiler et al. |
| 9,853,476 | B2 | 12/2017 | Lee et al. |
| 10,072,882 | B2 * | 9/2018 | Borchers ............... F25B 27/005 |
| 10,170,921 | B2 | 1/2019 | Yechieli |
| 10,579,123 | B2 | 3/2020 | Tuan et al. |
| 10,886,739 | B2 | 1/2021 | Day et al. |
| 10,969,852 | B2 | 4/2021 | Tuan et al. |
| 11,011,913 | B2 | 5/2021 | Smith et al. |
| 2006/0167592 | A1 | 7/2006 | McNally |
| 2011/0260675 | A1 * | 10/2011 | Jung ........................ H02J 7/35 |
| | | | 320/101 |
| 2012/0235625 | A1 | 9/2012 | Takehara |
| 2014/0278108 | A1 | 9/2014 | Kerrigan et al. |
| 2017/0146287 | A1 * | 5/2017 | Rezayat ................. F25D 13/00 |
| 2017/0263049 | A1 | 9/2017 | MacDonald et al. |
| 2017/0286838 | A1 | 10/2017 | Cipriani et al. |
| 2017/0332199 | A1 | 11/2017 | Elliott et al. |
| 2018/0106509 | A1 * | 4/2018 | Hollingsworth ...... F25D 11/025 |
| 2019/0220077 | A1 * | 7/2019 | Tuan ....................... H02J 13/00 |
| 2020/0150739 | A1 | 5/2020 | Tuan et al. |
| 2020/0244071 | A1 | 7/2020 | Smith et al. |
| 2020/0334600 | A1 * | 10/2020 | Wolf .................... G06Q 10/087 |
| 2021/0376612 | A1 * | 12/2021 | Barooah .............. G05B 13/048 |
| 2024/0011688 | A1 * | 1/2024 | Barg ....................... F25B 13/00 |

OTHER PUBLICATIONS

Black Stump Chillers and Cool Rooms, blackstumptechnolofiges.com.au/products/chillers-and-cool-rooms/, Black Stump Technologies, 3 pp.

* cited by examiner

THERMAL MANAGEMENT FOR SOLAR-POWERED OFF-GRID REFRIGERATION

CROSS-REFERENCE TO RELATED APPLICATION

This application claims the benefit of U.S. Provisional Patent Application Ser. No. 63/280,938, also entitled Thermal Management for Solar-Powered Off-Grid Refrigeration Construction, filed Nov. 18, 2021, which is incorporated herein by reference.

BACKGROUND

Generally, refrigerated containers incorporate a possibility to use plug-in electric power supply from external power systems, such as the power grid, portable electric generators, etc., either direct-current (DC) or alternating current (AC) based on the power bus for the refrigerated-unit electrical system and electric motors for the compressor and fans. Typical refrigerated shipping containers and mobile rooms include grid-connected units, units that operate on fossil-fueled generators, and systems that rely on solar photovoltaic power generation with battery energy storage. Units that are sold with power derived from solar photovoltaics and a battery energy storage system include companies such as California-based Aldelano Solar Solutions' Solar Cold-Boxes and Australia-based Black Stump Technologies' solar-powered chillers and cold rooms. These solar suppliers have control strategies that assess battery discharge levels.

SUMMARY

This Summary is provided to introduce a selection of concepts in a simplified form that are further described below in the Detailed Description. This Summary is not intended to identify key aspects or essential aspects of the claimed subject matter. Moreover, this Summary is not intended for use as an aid in determining the scope of the claimed subject matter.

In accordance with various embodiments of the present systems and methods for thermal management of solar-powered off-grid refrigeration a thermal and environmental control system may include an off-grid storage facility, wherein cooling equipment regulates temperature in a cold storage space of the off-grid refrigerated facility. An array of one or more solar photovoltaic panels produces electricity, and a battery pack in operable connection with the array of solar photovoltaic panel(s) stores the electricity produced by the one or more solar photovoltaic panels and provides electrical power to the cooling equipment during periods of no solar insolation and periods of solar insolation insufficient for the one or more solar photovoltaic panels to power the cooling equipment. A local computer processor at the off-grid storage facility is in operable connection with the cooling equipment to provide a regulating signal to the cooling equipment for maintaining battery state-of-charge above a specified lower state-of-charge limit, maintaining one or more adjustable thermal setpoints for the cold storage space, and maintaining environmental conditions to sustain quality and life of the goods requiring cold storage in the refrigerated space. To wit, a cloud-based computing system is in operable communication with weather data and in operable communication with the local computer processor. The cloud-based computing system computes, based at least in part on current measured and forecasted weather data, the one or more adjustable thermal setpoint(s) to maintain quality of and life of the goods requiring cold storage in the off-grid refrigerated storage facility and sustain battery state-of-charge above the determined lower limit, and maintain the predetermined environmental conditions.

In various embodiments, the cloud-based computing system has a meta-model, or the like, configured to run forward and backward in time to provide forward-based meta-model adjustments to better simulate past power demands and cold-storage performance data and to assess adjustments to thermal setpoints and battery state-of-charge limits based on weather forecasts and expected solar incidence. Also, in various embodiments, the cloud-based computing system includes a meta-model, or the like, that evaluates loss of storage life of cold-storage goods, and makes an update to the regulating signal, based, at least in part, on the loss of life of cold-storage goods. This update may include the one or more adjustable thermal setpoints to maintain a temperature, and fresh-air supply to the cold storage to maintain specified environmental conditions such as gas concentrations, so as to maintain electrical operation of the off-grid storage facility while minimizing loss of storage life of the cold-storage goods. In various embodiments, the cloud-based computing system includes an adaptive model algorithm that adjusts key model parameters to update the model to simulate past system performance including solar panel electric power production, refrigeration unit power demands and duty cycles, cold storage temperature distribution, and battery state-of-charge change.

In various embodiments, an optimized battery usage, the one or more adjustable thermal setpoints, and the adjustable environmental conditions include fresh air fan control, and the one or more adjustable thermal setpoints and adjustable fan control are selected together, by the cloud-based computing model, which evaluates performance at different setpoints to minimize loss of storage life of cold-storage goods.

In various embodiments, the off-grid storage facility includes a humidity sensor disposed in the cold storage space and an optimized battery usage, the one or more adjustable thermal setpoints and the adjustable environmental condition setpoints include gaseous humidity, and the thermal setpoint and humidity setpoint are selected together to minimize loss of storage life of the cold-storage goods by adjusting fresh air supplies to the cold storage space to displace humidity. Also, in various embodiments, an optimized battery usage, the one or more adjustable thermal setpoints, and the adjustable environmental condition setpoints include carbon dioxide concentration and/or hydrocarbon concentration to determine a controlled fresh air supply, and the thermal setpoint and carbon dioxide concentration and/or hydrocarbon concentration setpoints are selected together to minimize loss of storage life of the cold-storage goods by adjusting fresh air supplies to the unit to displace internal carbon-dioxide or hydrocarbon-laden air.

In various embodiments, phase-change material panels may be disposed in the cold storage space. Such phase-change material panels capture thermal energy to provide cold-temperature storage during operation of the cooling equipment during periods of excess solar power and full battery state-of-charge and provide internal temperature stabilization in the cold storage space at desired cold storage space temperatures and reduce battery discharge during periods of low solar insolation. Additionally, or alternatively, in various embodiments, phase-change materials may include a pumped phase-change solution, which may be pumped around specified locations in the cold storage space to capture thermal energy to provide cold-temperature storage during operation of the cooling equipment during periods of excess solar power and full battery state-of-charge, and provide internal temperature stabilization in the cold storage space at the determined cold storage space temperatures and reduce battery discharge during periods of low solar insolation. In such various embodiments, the cloud-based computing system may, through an adaptive model algorithm, or the like, control electric power for pumping of the phase-change solution by incorporating the pumped phase change material heat transfer into the adaptive model algorithm, or the like.

Other embodiments are also disclosed.

Additional objects, advantages and novel features of the technology will be set forth in part in the description which follows, and in part will become more apparent to those skilled in the art upon examination of the following, or may be learned from practice of the technology.

BRIEF DESCRIPTION OF THE DRAWINGS

Non-limiting and non-exhaustive embodiments of the present invention, including the preferred embodiment, are described with reference to the following figures, wherein like reference numerals refer to like parts throughout the various views unless otherwise specified. Illustrative embodiments of the invention are illustrated in the drawings, in which.

DETAILED DESCRIPTION

Figure 1:
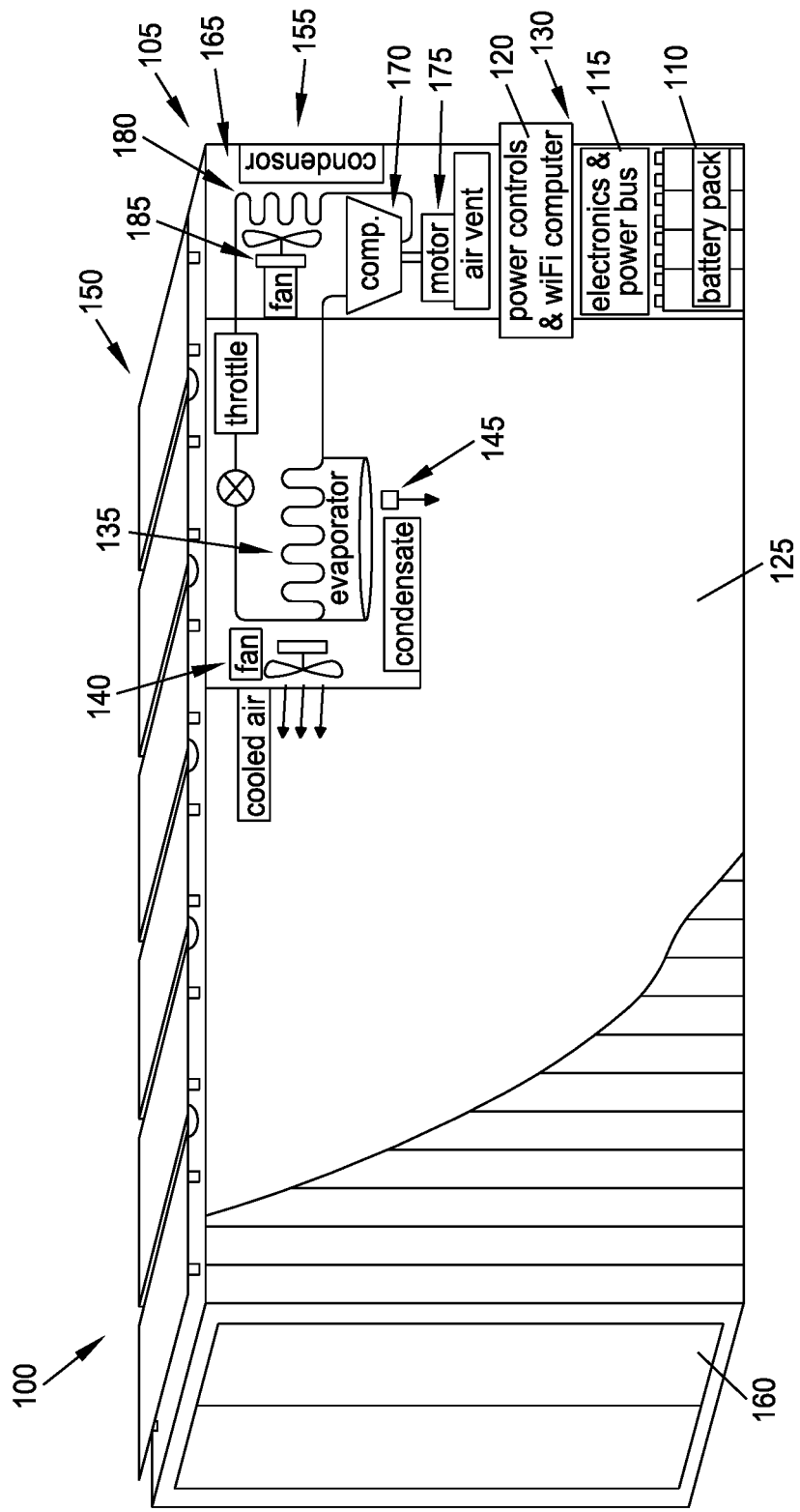
FIG. 1 illustrates a schematic view of a mechanical layout of various components of a solar-powered refrigerated shipping container, according to some embodiments.

Embodiments are described more fully below in sufficient detail to enable those skilled in the art to practice the system and method. However, embodiments may be implemented in many different forms and should not be construed as being limited to the embodiments set forth herein. The following detailed description is, therefore, not to be taken in a limiting sense.

As noted, typical solar-powered refrigerated units may have power derived from solar photovoltaics and a battery energy storage system. While relatively straightforward, but with additional costs, a solar-powered refrigeration unit with battery energy storage can be controlled simply by modifying state-of-charge limits for maintaining battery life and providing back-up fossil-fueled generator sets during periods of no or inadequately low solar insolation and of low battery state-of-charge. However, these typical units typically have control strategies that assess battery discharge levels, but do not utilize model-predictive controls, or the like, such that may communicate with updated weather forecasting to enable temperature and storage condition optimization to sustain grid-independent operation, even through days of low solar insolation, such as in accordance with embodiments of the present systems and methods.

In an embodiment, there is provided a solar-powered refrigerated shipping container. Thermal and environmental control may be supported by battery energy storage and power electronics for energy management. This may also incorporate alternative thermal energy (i.e., cold) storage and gas-concentration management that optimizes lifetime of stored goods under the constraints of off-grid operation. As used herein, the term "off-grid" means not connected to the public utility or other external power grid, or in accordance with embodiments of the present systems and methods, a power generator, or the like. In various embodiments, an off-grid cold storage space is provided, with a thermal and environmental control system, that includes panels of solar photovoltaic cells for producing direct-current, high voltage electricity, a solar charge controller to convert the high-voltage electric power into a voltage amenable for battery storage and supply to power electronics, packs of batteries for electrochemical energy storage unit in operable connection to the solar photovoltaic panels and configured to store excess electricity produced by the solar photovoltaic panels and not needed concurrently for powering the refrigeration unit. Power electronics such as, but not limited to an inverter convert the battery electric voltage and power into an appropriate electric voltage and power for driving a cooling unit and supporting controls and measurement hardware. A cooling unit including an external condensing unit and an internal evaporator unit, such as a refrigerant compressor, a heat-rejecting condenser with a fan external to the cold storage space, and an evaporator coil with a fan in the cold storage space are in operable connection to the energy storage unit. The cooling equipment is configured to regulate the temperature of the off-grid cold storage facility and the power demand to operate the cooling unit compressor and fans. A computer processor-based, purpose-built, control unit at the off-grid cold storage facility, the control unit is in operable connection with the cooling equipment, the control unit is configured to provide regulating signals to the cooling equipment and energy storage unit. A cloud-based computing system is in operable communication to dynamic weather forecast data and in operable communication to the control unit for the off-grid cold storage facility. This remote cloud-based computing system is configured to simulate power demands for the cooling unit for the cold storage facility and power generation of the solar photovoltaic panels, and thereby, to compute battery state-of-charge and to adjust thermal setpoints and environmental condition setpoints for the off-grid storage facility.

Figure 2:
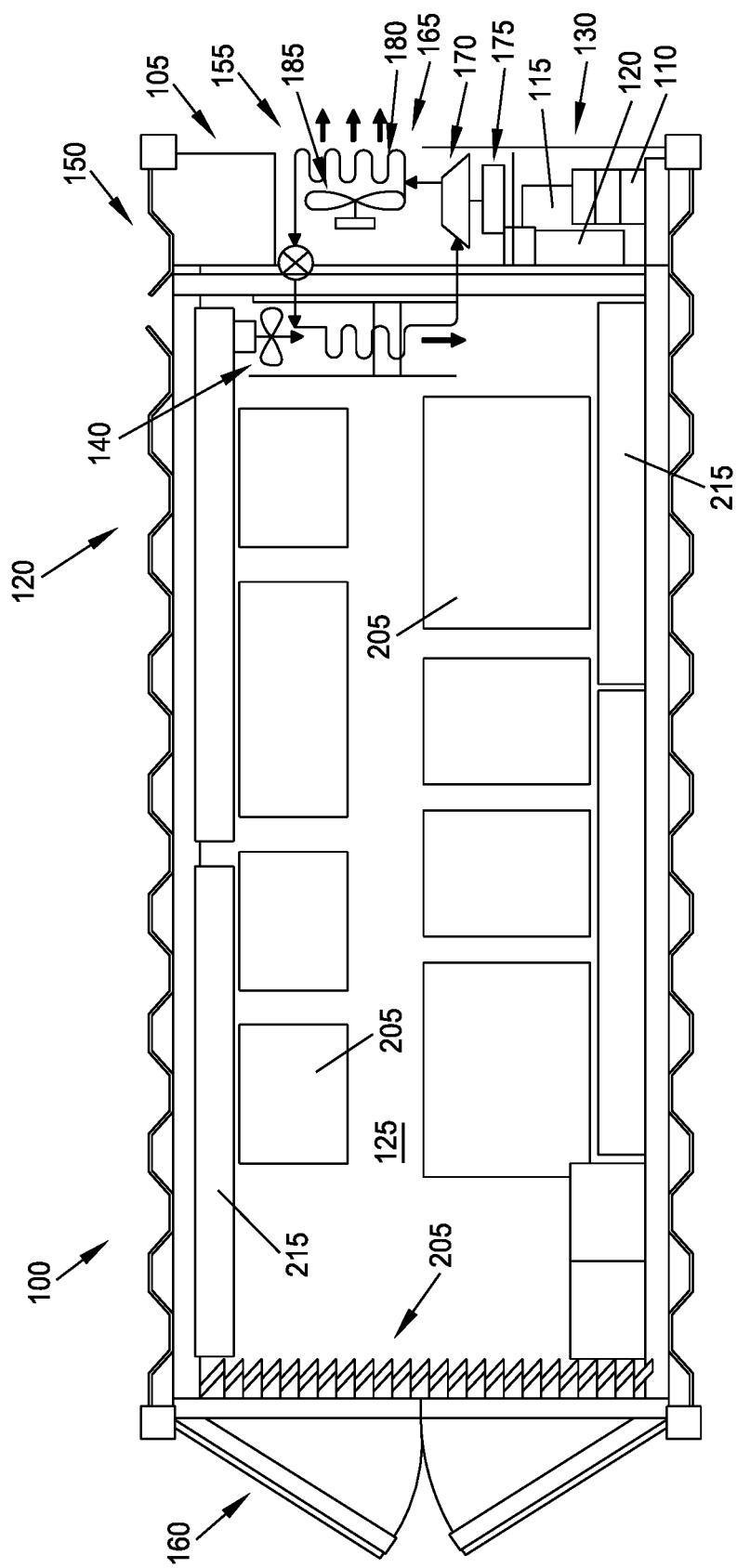
FIG. 2 illustrates a schematic, partially fragmented, view of an exemplary layout of internal structural space of the solar-powered refrigerated shipping container of FIG. 1, according to some embodiments

To provide some context for further discussion, it is noted, FIGS. 1 and 2 illustrate components of an example embodiment of the off-grid cold storage system for the present thermal control strategy to maintain solar-powered off-grid refrigeration, in accordance with embodiments of the present systems and methods.

FIG. 1 is a high-level, partially fragmented, schematic view of a mechanical layout of various components of solar-powered refrigerated shipping container 100, including vapor compression refrigeration cycle components 105, battery pack 110 for electrochemical energy storage, and power electronics 115 for solar-powered refrigerated shipping container 100, with wireless network protocol-connected computer processor-based, purpose-built, control unit 120. Control unit 120 is configured, in accordance with embodiments of the present systems and methods, to connect with weather forecasting services and a remote cloud-based modeling program to update control set points for temperature and/or for humidity and gas concentration in thermally and environmentally cold-storage room(s) 125, while optimizing ability of batteries 110 to provide continuous operation through periods of no and/or low solar insolation.

FIG. 1 shows an implementation where battery pack storage 110, power electronics 115, and control unit 120 are in isolated space 130, which may be accessible outside of thermally and environmentally cold-storage room(s) 125. Temperature-controlled cold zone(s) 125 house cold stored goods, and includes chiller unit 135 of vapor compression refrigeration cycle components 105, including circulating fan 140 and condensate collection system 145, as well as the stored goods. Sensors (wireless or otherwise) (not shown) may be deployed within cold storage environment 125 to assess temperature, humidity, and concentration of gases (e.g., hydrocarbons) such as ethylene, which are known for playing a critical role in lifetime of commonly stored fresh produce.

FIGS. 1 (3 and 4) show the external configuration of a unit with solar panels 150 deployed on the roof of solar-powered refrigerated shipping container 100 for local power production to provide power for charging batteries 110 during periods of solar insolation. In various embodiments, phase-change materials may be provided, as discussed below, in operable connection within the refrigerated room for reducing electric power demands and total energy storage for battery pack 110.

FIG. 2 is a high-level, schematic, partially fragmented, top plan view of an exemplary layout of internal structural space of solar-powered refrigerated shipping container 100 of FIG. 1, according to some embodiments, showing externally accessible control space 130 for hot-side 155 of vapor-compression cycle components 105 and battery (110) storage, power electronics (115), and control unit 120 in (isolated) externally accessible control space 130. In the illustrated embodiment of FIG. 2, Stored goods 205 are shown in temperature and environment-controlled cold-storage space 125, within solar-powered refrigerated shipping container 100 and plastic curtains 210 to retain cold in cold-storage space 125 when doors 160 of solar-powered refrigerated shipping container 100 are open. Insulation panels 215 facilitate retention of cold in cold-storage space 125.

In some embodiments, phase-change materials, either as pumped solutions or internal panels, may be used to maintain cold in cold-storage space 125, reducing electric power demands and total energy storage for battery pack 110. In such embodiments insulation panels 215 may be complemented by, or may include, such phase-change materials. In some embodiments, phase-change solutions may be pumped around key locations in the unit. Such phase-change material panels or pumped phase-change solutions capture or absorb thermal energy without increasing temperature and provide internal temperature stabilization at desired refrigerated space temperatures, enabling cold storage by refrigeration unit operation during periods of excess solar power and full battery state-of-charge in order to reduce battery discharge requirements during subsequent periods of low solar insolation and to provide improved flexibility for sustaining grid-free refrigerated unit operation.

Figure 3:
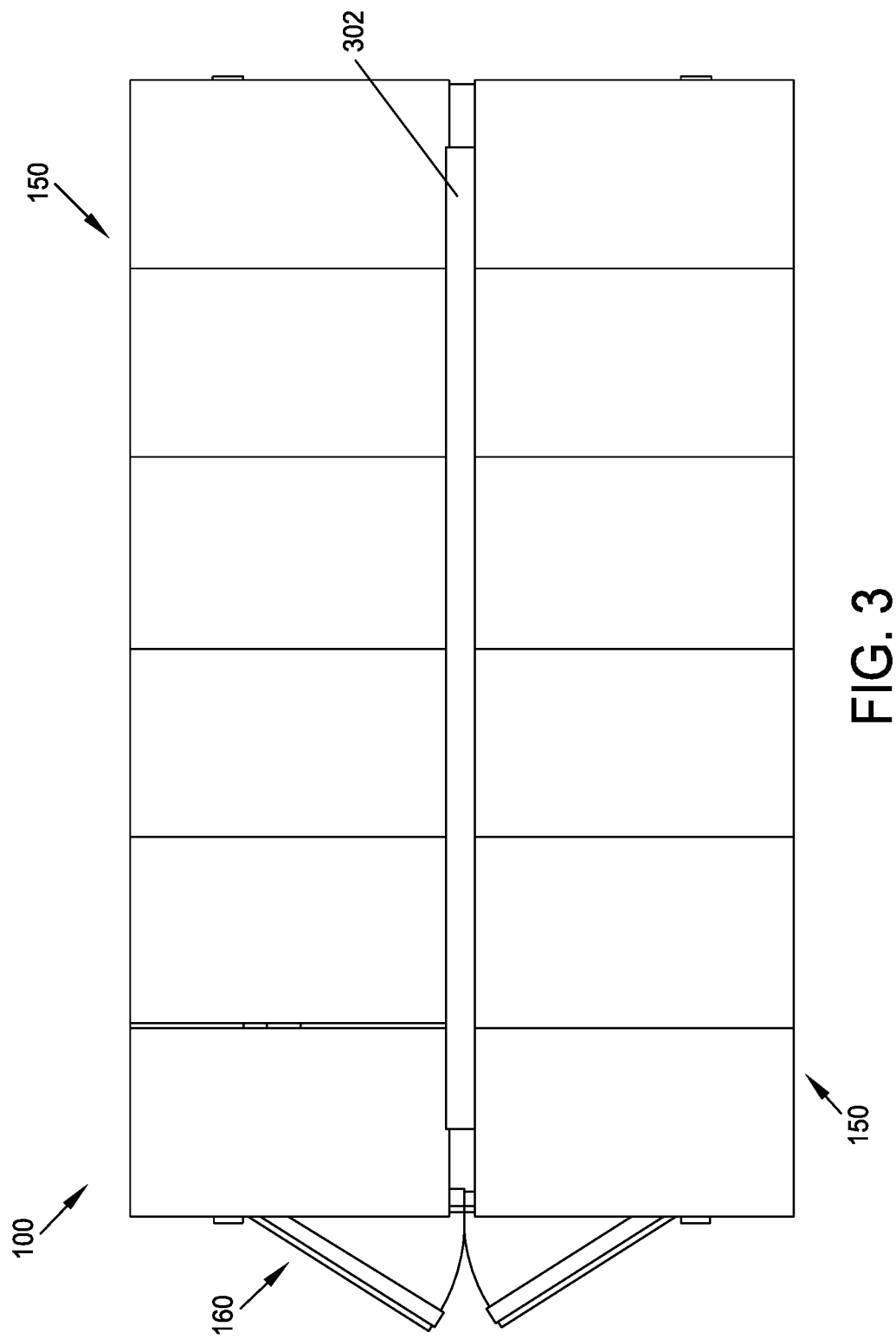
FIG. 3 illustrates a schematic top view of an exemplary layout of the solar-powered refrigerated shipping container of FIG. 1, according to some embodiments.
Figure 4:
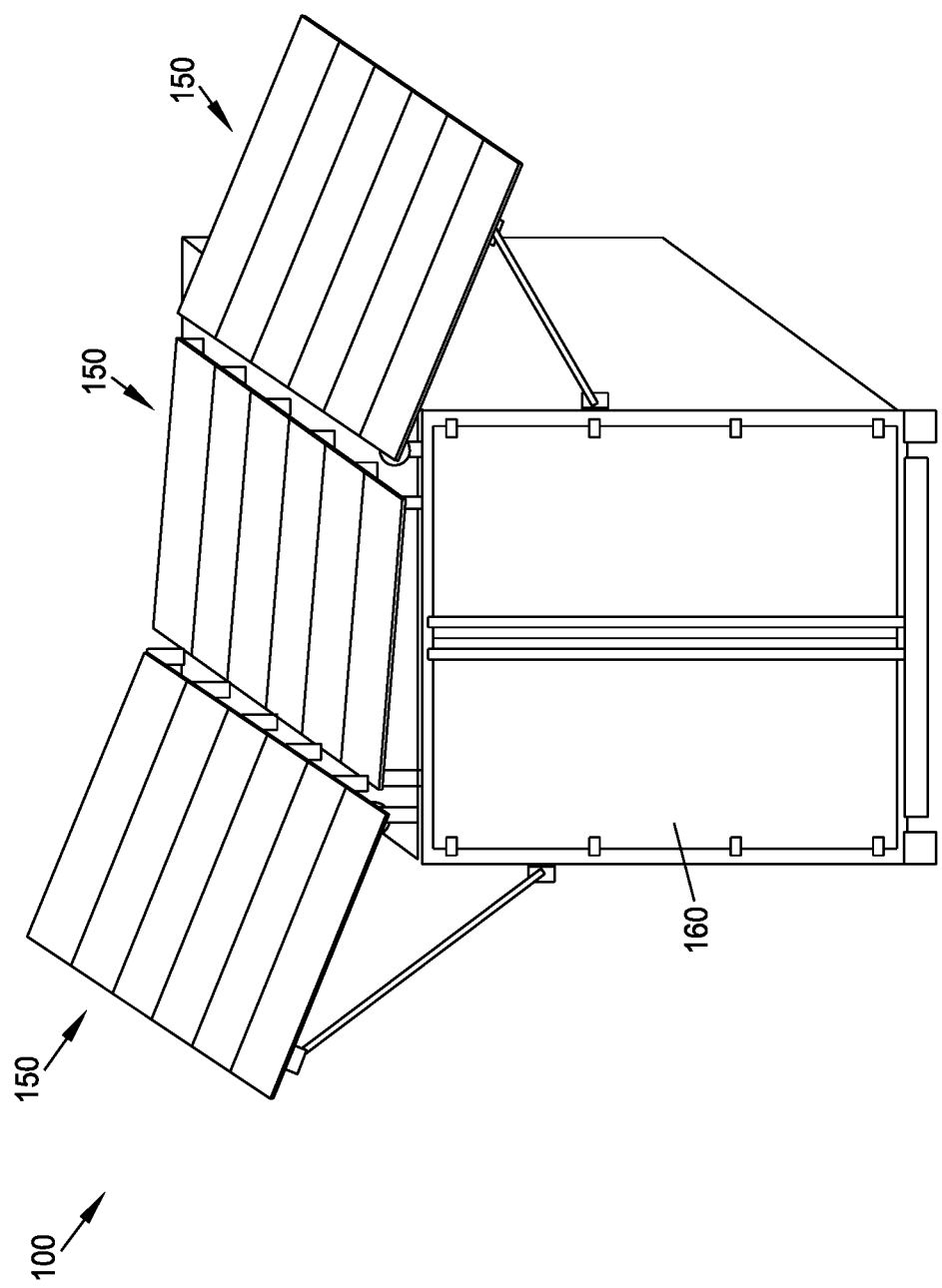
FIG. 4 is a perspective view of another exemplary layout of the solar-powered refrigerated shipping container, showing extended solar panels, according to some embodiments.

FIG. 3 is a schematic top view of an exemplary layout of solar-powered refrigerated shipping container 100 of FIG. 1, according to some embodiments. FIG. 4 is a perspective view of an exemplary layout of solar-powered refrigerated shipping container, FIG. 4 is a perspective schematic view of another exemplary layout of the solar-powered refrigerated shipping container 100, showing extended solar panels, according to some (other) embodiments. FIGS. 3 and 4, illustrates deployed solar panels 150 shown extending beyond the roof of refrigerated container 100, such as, in order to increase electric power generation. FIG. 3 shows an example of power cable 302 run to the power electronics (115) and battery storage unit (110) outside the cold-storage space (125), within solar-powered refrigerated shipping container 100. In the example embodiment of FIG. 4, solar panels 150 are mounted, and otherwise configured to fold, one on top of another, for transport of solar-powered refrigerated shipping container 100 and to be deployed in an angular fashion, as shown, so as to, in conjunction with placement of solar-powered refrigerated shipping container 100, capture more effectively solar insolation into the panels.

With reference to FIGS. 1 through 4, in various embodiments, the solar-powered refrigerated shipping container 100 may include elements for controlling off-grid cold-storage facility 100, which will now be described in greater detail, with reference back to FIGS. 1 through 4. Primary thermal and humidity control unit 105, shown in FIGS. 1 and 2, may include a vapor compression cycle 105 with condensing unit 165, mounted outside cold storage space 125, and one or more evaporators 135 with condensate removal 145, internal to cold space 125. Condensing unit 155, which resides outside cold-storage space 125, may include a refrigerant compressor 170 and its electric motor (DC or AC) 175 and a refrigerant-loop condenser 180 with a fan 185 for heat removal driven by an electric motor (DC or AC). Both the compressor and fan motors draw power as needed from the battery pack along with any sensors (not shown) to be used for assessing power and operating conditions from the unit. In addition, one or more internal refrigerant evaporator unit cooling coil(s) 135 are mounted in the cold storage space(s) 125 for refrigerant heat extraction, fan 140 for blowing room air over the coils for heat removal, and a condensate collection system 145 with drain to the outside for removing humidity condensed off the evaporator cooling coils.

Secondary thermal and environmental control units (not shown) may include phase-change (solid-liquid) materials (PCMs) either as fixed wall panels (e.g., in place of, in addition to, or as part of insulation panels 215) with air fans (not shown) directing flow across the panels or as pumped multiphase liquids for sustaining cold storage temperatures through thermal energy storage, particularly during low-power operation of the cold-storage unit. The phase change materials can be thermally recharged with secondary evaporator coils that provide cold air or direct cooling to resolidify the material during periods of excess solar power. In addition, the cold storage space may include a fresh-air supply fan (not shown) that exchanges internal air with the outside ambient air in order to control internal humidity levels, CO2, and hydrocarbon. Another optional environmental control unit might include a desiccant or ethylene scrubber (not shown) fitted with a fan to pull cold humid and/or carbon dioxide or hydrocarbon-contaminated air over the unit to extract water vapor, carbon dioxide, or hydrocarbon gases from the cold-storage air space. These optional units may, in accordance with embodiments of the present systems and methods, be activated under conditions where low-power thermal control led to higher temperature conditions causing more rapid production of water vapor or ethylene.

Figure 5:
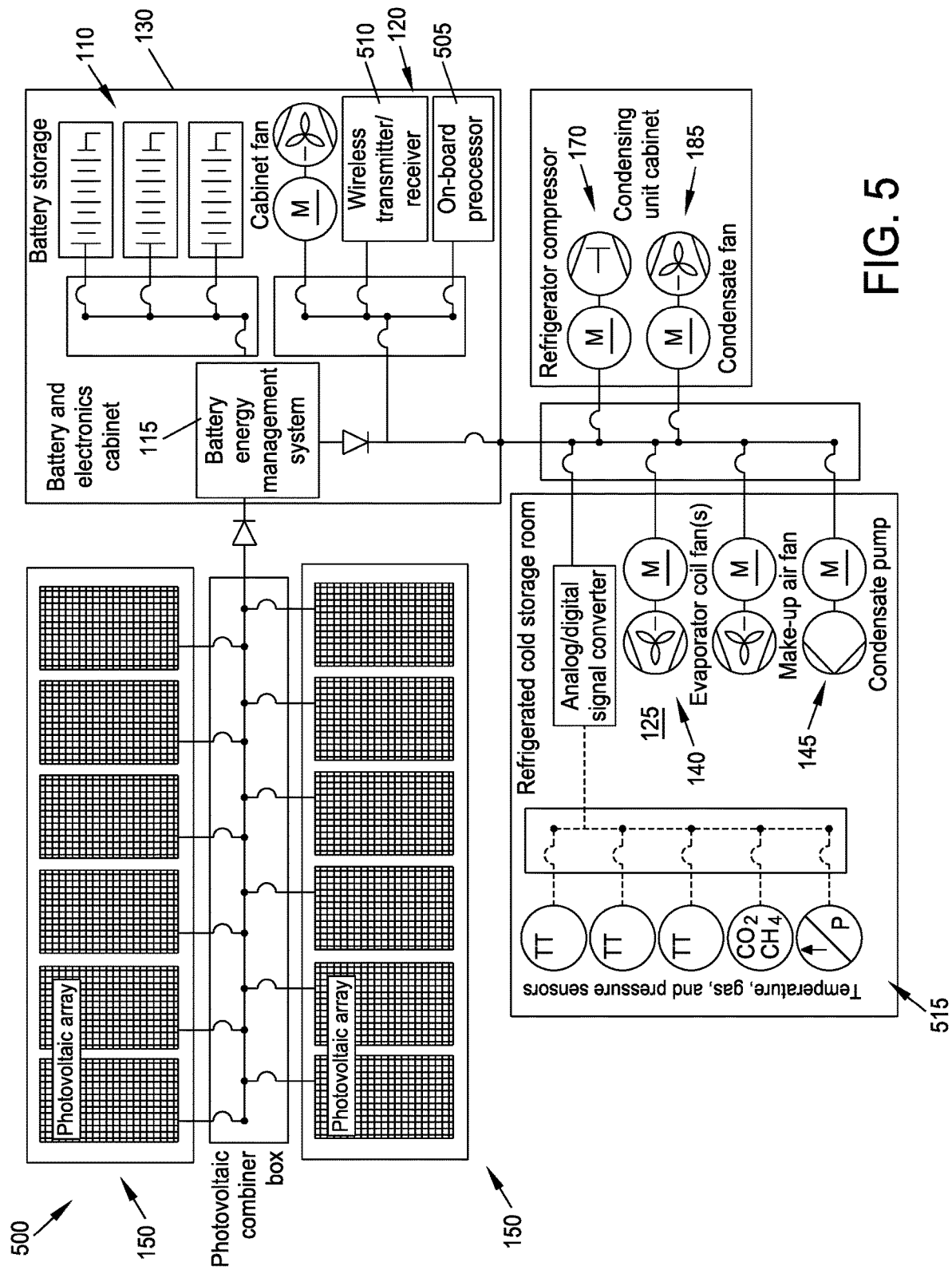
FIG. 5 is a schematic illustration of example power and controls architecture of an exemplary electrical power and instrumentation signal network in the solar-power refrigerated unit of FIGS. 1 through 4, according to some embodiments.

FIG. 5 is a schematic illustration of example power and controls architecture of an exemplary electrical power and instrumentation signal network in the solar-power refrigerated unit of FIGS. 1 through 4, according to some embodiments. With reference now to FIG. 5, there is shown a layout of electrical power and instrumentation signal network 500 in solar-power refrigerated unit 100 with on-board control 120 communicating with Wi-Fi-enabled instrumentation signal transmitter 115 and model information data receiver for updating on-board controller 120. FIG. 5 illustrates power distribution with all control instrumentation for measurements that communicate to on-board computer processor 505, such as employed in purpose-built control unit 120, for controlling the battery energy management system.

Rechargeable battery pack 110 and energy management system 120, shown in FIGS. 1, 2 and 5, may include the rechargeable battery pack for energy storage, and electric power distribution to support the off-grid cold-storage facility, including to provide power to the cooling equipment during periods of low or no solar insolation. The battery chemistry can be any rechargeable system including any of the various Li-ion batteries, deep-cycle lead-acid batteries, or Ni—Cd batteries. The battery power input/output, and state-of-charge monitoring, and cell voltage distribution may be monitored by an integrated battery management system 120 that includes cutoff field-effect transmitters, state-of-charge monitor, microcontroller with a state machine, solar photovoltaic power array, sensors for thermal and environmental control and performance tracking, computer processor 505 with an input/output data acquisition system and a non-volatile digital memory system, wireless-network-connected receiver and transmission unit 510 for communication with remote computer facility housing a model-predictive control simulation program with a system model for predicting performance, assessing control parameters, and adapting model parameters.

The cutoff field-effect transmitters isolate power inputs from solar panels 150 from the different outputs to the various power demands for the cold storage unit and local computational needs. Charge monitoring may be based on input/output current measurements, battery cell-voltage and balance system, and battery temperature.

The microcontroller with a state machine provides sensor information to a computer processor-based, purpose-built, unit that receives and send commands through a wireless-network-enabled communication system to a remote computer system running model-predictive controls that simulate the unit with various battery management system settings in order to update battery management system controls based on weather forecasting and cold-storage operational scenarios to sustain reliable off-grid refrigeration unit operation.

Solar photovoltaic power array 150 (shown variously in FIGS. 1, 3, 4 and 5) may include an externally mounted solar photovoltaic panel array. The panels provide electric power input for the battery pack and external wall thermal load reduction through shading during periods of high solar insolation. Solar photovoltaic power array 150 is sized, in accordance with embodiments of the present systems and methods, adequately to provide more electric power than the average electric power output to, and consumed by, entire facility 100 over an integrated period of time. Photovoltaic panel array 150 is connected through the battery management system 120 both for battery charging and for power distribution (115) to the necessary electric power loads of refrigerated storage system 100.

The sensors 515 for thermal and environmental control and performance tracking may incorporate multiple thermal measurements for assessing the power load required from the refrigeration condensing unit (compressor 170 and condenser fan 185 motors) and evaporator unit(s) (fan 140 motors) to optimize cooling under constraints of the maintaining adequate battery state-of-charge. This is determined by solar resources availability in upcoming days assessed by the remote dynamic model integrated with local weather forecasting and correlations between weather and unit performance. Temperature measurements may include wireless sensors co-located with sensitive stored goods 205 to optimize cooled air flow distribution. In addition, (optional) sensors to detect humidity levels and/or ethylene and $CO_2$ concentrations may be incorporated for evaluating the lifetime of cold-storage goods, particularly, fresh produce. Data from the gas sensors is, in accordance with embodiments of the present systems and methods, transmitted to remote simulation tools to optimize fan 140 motor powers for evaporator unit(s) 135 and for fresh air exchange or desiccants.

Local, purpose-built, computer processor-based control unit 120 with an input/output data acquisition system and a non-volatile digital memory system may be capable of running software that can manage a data acquisition system for retrieving data and executing an actuation control strategy through the battery management system. The refrigeration unit control strategy is, in accordance with embodiments of the present systems and methods, received via remote communications with a non-local computer facility running simulations of the cold-storage facility to update controls and model parameters for maintaining adequate battery state-of-charge. Sensor-data retrieval may include internal and external temperatures, gas compositions, and power supplies and loads so as to provide adequate data measurements to recalibrate or adapt uncertain parameters in the uncertain models and to thereby improve the model's predictive capacity for running the battery management system 120 in order to ensure reliable off-grid operation through upcoming periods of no or low solar insolation.

Figure 6:
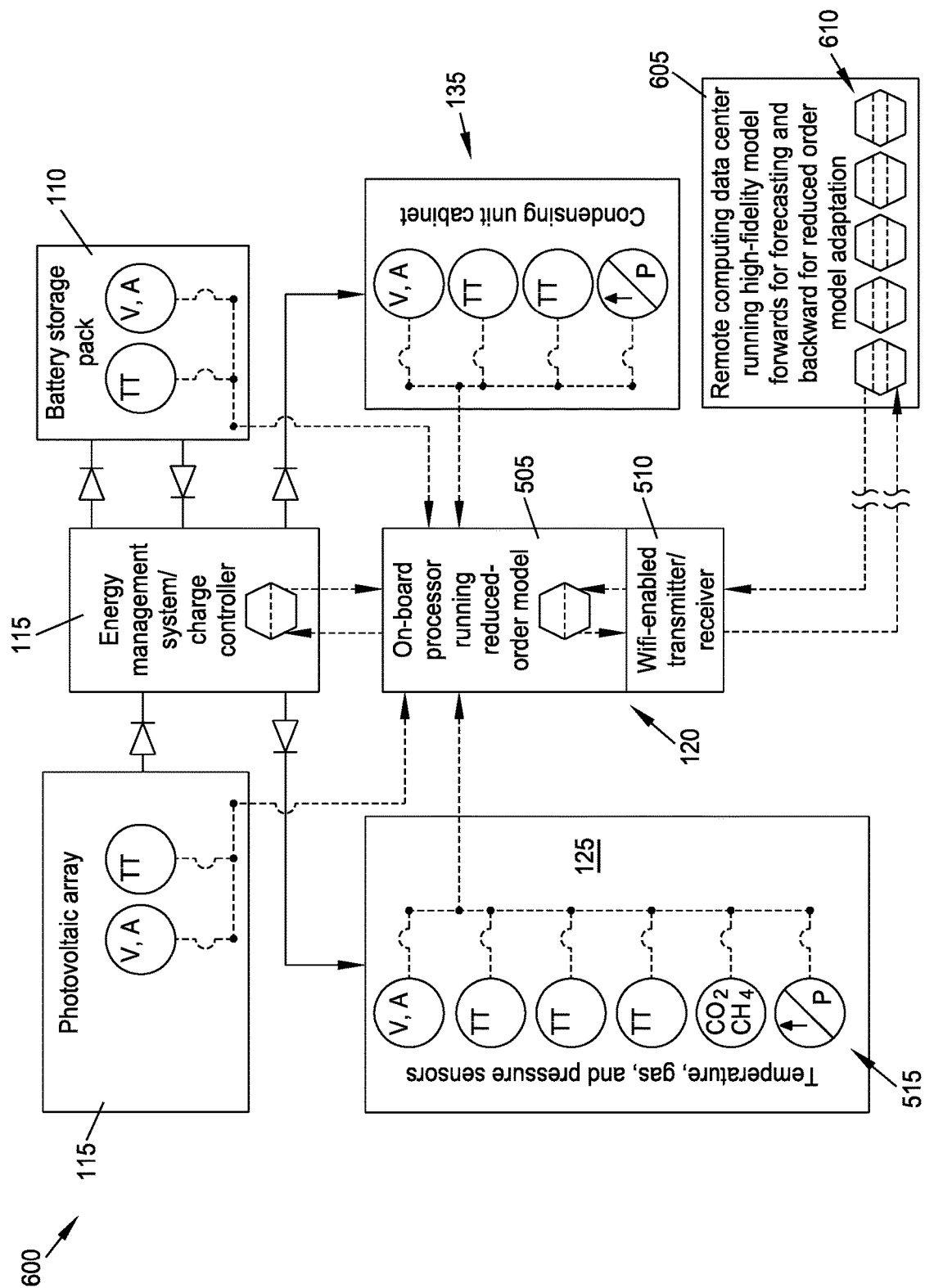
FIG. 6 illustrates a schematic layout of an exemplary computational architecture such as may be employed in accordance with some embodiments of the present systems and methods.

FIG. 6 illustrates a schematic layout of exemplary computational architecture 600 such as may be employed in accordance with some embodiments of the present systems and methods. Computational architecture 600 receives wireless-network-enabled communication with remote computing data center 605 running high-fidelity model 610, and computer processor-based, purpose-built, local control 505 communicating with battery energy management system 115.

Wireless-network-connected receiver and transmission unit 510 may be configured for communication with the remote computer facility supporting a model-predictive control simulation of the full cold storage facility with power sources, battery energy storage, refrigeration unit, and ventilation system. The system includes wireless-network-connected receiver and transmission unit 510 powered by the batteries to support radio communication with remote computational facility 605. The wireless transmitter may pass stored time-series sensor data for temperatures, humidity and gas concentrations, solar power generation, electric power loads, and battery state-of-charge. The Wi-Fi receiver receives control parameters derived from remote simulations of the unit integrated with dynamic weather-forecasting.

Remote computational system 605 may include system model 610 for predicting performance, assessing control parameters, and adapting model parameters. Wi-Fi receiver and transmitter 510 may provide data to, and receive data from, remote computational system 605 with a full integrated thermal and power model of the refrigerated storage unit with the solar array and battery power system. The remote model incorporates dynamic local-weather forecasting that may assess the integrated solar power over a multi-day time window and the remote model may adjust power loads to ensure batteries maintain adequate state-of-charge over the model window. The model runs simulations with revised temperature and humidity setpoints and fan powers for air exchanges as necessary to identify control parameters that support adequate battery state-of-charge during off-grid operations over the simulation time window. Temperature and humidity setpoints may be incorporated into a meta-model of stored goods 610 that evaluates the loss of life of the cold-storage goods to make an informed update to system operating parameters, including temperature and fresh-air supply to the cold storage, to maintain off-grid operation while minimizing undesirable loss of storage life. In addition to forecasting, the model will also be regularly validated against past sensor data using stored weather conditions to evaluate if empirical parameters related to thermal energy balances and power loads should be adapted to provide improved fidelity in predictive simulations.

Data center 605 may be configured to run a high-fidelity model 610 and operationally interact with a local, purpose-built, computer processor-based control 505 providing a battery energy management system. Remote computation with high-fidelity system model 610 may be configured to simulate past performance to assess reduced-order model prediction of performance and to provide updates to parameters in the reduced-order model so as to better simulate unit performance of both the refrigeration unit and the battery energy management system for assessing electrical loads and thermal management. Remote computation with high-fidelity system model and updated model parameters 610 predicts future performance of refrigeration unit and battery energy management system based on dynamic weather forecasting and expected system thermal loads. This remote computation may simulate adjusted temperature and cooling load settings to identify appropriate settings to maintain battery state-of-charge through various multi-day weather events so as to provide both electrical load management and appropriate thermal management.

Various embodiments may involve the implementation of a control strategy to ensure around-the-clock operation for a refrigerated shipping container 110 or a stand-alone facility that is powered exclusively by photovoltaic solar panels 150 and batteries 110 that are charged when the solar panels provide excess electrical energy. The control strategy may involve model predictive controls based on energy models of the container/facility that imports real-time weather forecasting (through wireless data transmission) to adapt temperature and fan settings to optimize battery energy storage for longer operation through periods of inadequate solar insolation (both at night and during sustained cloudy weather events). Model 610 may run over prescribed time intervals based on frequency and accuracy of weather forecast updates to ensure continuous operation while the refrigerated unit is independent of the electric-utility grid.

Physics-based energy model 610 will predict energy loads for cooling or, if necessary, heating) in order to sustain one or more adjustable set point temperatures and humidity levels within the refrigerated unit. Model parameters, including but not limited to, effective zonal heat transfer coefficients between the internal walls and air flows and between the external walls and air flows, may be refined/adapted based on recent energy load measurements to improve accuracy of energy load predictions with a range of weather forecasts. The adaptive model algorithm may adjust key model parameters to update the model to simulate more accurately recent system performance including solar panel electric power production, refrigeration unit power demands and duty cycles, cold energy storage temperature distribution, and battery state-of-charge evolution.

The model may also incorporate the use of phase-change materials, either as internal panels or pumped solutions, in order to provide an alternative method for thermal energy capture to slow battery discharge times and thereby to improve flexibility of the control strategy for sustaining grid-free refrigerated unit operation. For example, the electric power for the pumping of the fluid may, in accordance with embodiments of the present systems and methods, be controlled by incorporating the pumped phase change material heat transfer into the predictive system performance model. Therein, the phase-change materials may be pumped around key locations in the unit to capture thermal energy and provide internal temperature stabilization at desired refrigerated space temperatures.

The optimized battery usage, the thermal setpoint, and the environmental conditions of the off-grid storage facility may also include fresh air fan control, and thermal setpoints and fan controls are together selected to minimize undesirable loss of storage life of the cold-storage goods. The optimized battery usage, the thermal setpoint, and the environmental conditions of the off-grid storage facility may further include a carbon dioxide and/or hydrocarbon (such as ethylene) setpoint to determine a controlled fresh air supply, and the thermal setpoint and carbon dioxide and/or hydrocarbon setpoints are together selected to minimize undesirable loss of storage life of the cold-storage goods by adjusting fresh air supplies to the unit to displace internal carbon-dioxide or hydrocarbon-laden air.

Thus, in various embodiments, there may be provided one or more of the following. Refrigerated container 100 or stand-alone room (125) that provides the ability to store and provide refrigeration for items 205 such as food, medicine, or other perishable items that require refrigeration or freezing. A vapor compression cooling unit that includes at least one evaporator coil 135 inside the container/room for cooling 125, together with fan 140 for blowing air over the evaporator coil to circulate cooling throughout the room. Electric-motor (DC or AC) 175 powered compressor 170 (which may have variable speed capability) located outside chilled room 125 such as on the roof or side of the room to provide refrigerant compression and temperature increase. Condenser 180 provides rejection of heat transferred into the refrigerant flowing through an evaporator coil. Solar-panel photovoltaics 150 with adequate surface coverage to provide cooling and battery charging during typical sunny days with no more than minor cloud cover. Battery electrochemical energy storage system 110, such as Li-ion or other battery chemistry that provides, in accordance with various embodiments of the present systems and methods, more than twenty hours of stand-alone operation of the refrigeration system at desired set points independent of solar photovoltaics energy input. Electric power-distribution system 115 provides electric power through either a DC power bus, such as with a DC-DC converter, or an AC power bus with a DC-AC inverter. A set of temperature control units with temperature measurement signals that provide a control signal for all independent zones and other key temperature measurements for system performance monitoring. Wireless-connected control system 505 which takes in temperature measurements, photovoltaics electric power output, battery voltage, and state of charge in order to manage the power electronics, the compressor power, and the desired zonal temperature setpoints. Remote cloud-based software system 605 runs model-predictive controls 610 that communicates with the refrigeration unit to set cooling temperature and battery charging parameters, regularly runs the refrigeration system model forward in time based on latest weather forecasts to update control signal, and regularly runs the model backwards in time to update model parameters to better simulate the refrigeration unit and the zonal temperature profile in cold storage space 125. That is, computer model 610 run/looks both forward and backward in time (i.e., the computer model provides forward-based adjustments in response to past data as well as future data, e.g., weather forecasts and expected solar incidence). The model control signals include temperature set points (to within a prescribed range of operation) to ensure adequate battery discharge times between solar-driven recharging periods (based on updated forecasting). Thusly, the cloud-based computing system computes optimized thermal setpoints for maintaining quality of cold storage and sustaining battery state-of-charge, and environmental conditions of the off-grid storage facility based on the current measured and the forecasted weather data.

Figure 7A:
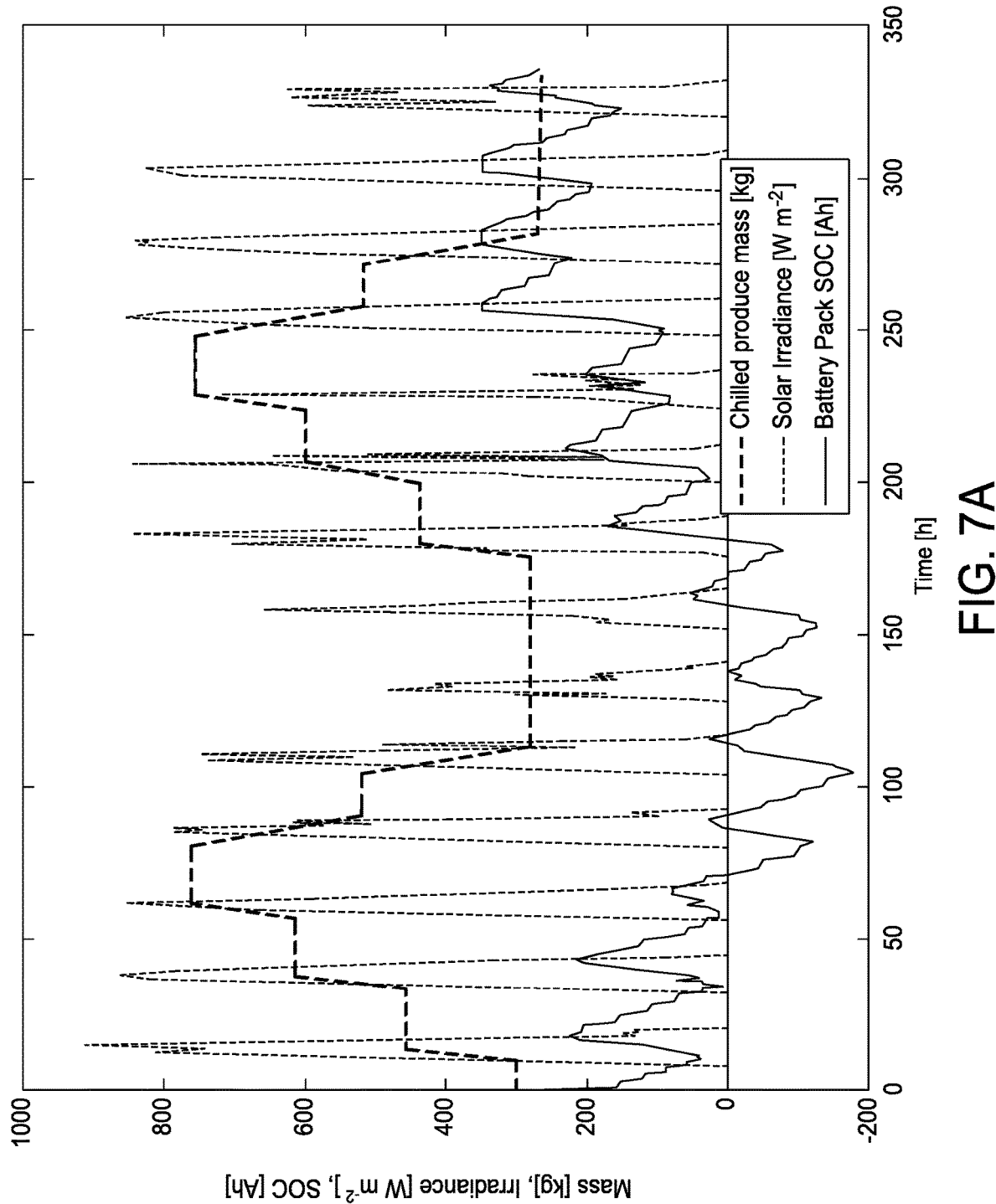
FIGS. 7A and 7B illustrate model simulated off-grid performance of a solar-powered refrigerated container with battery storage, according t some embodiments.
Figure 7A:
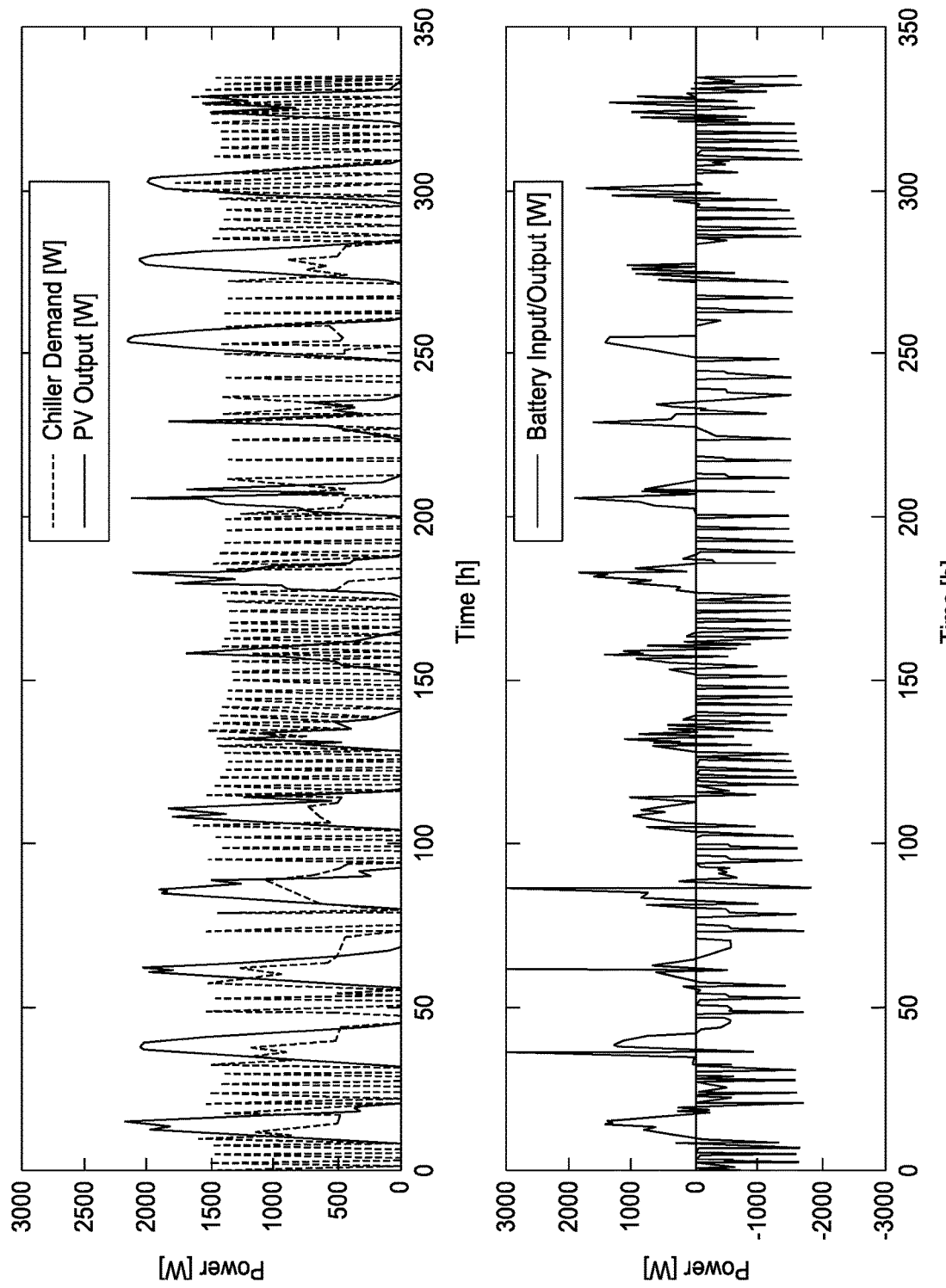
Figure 7B:
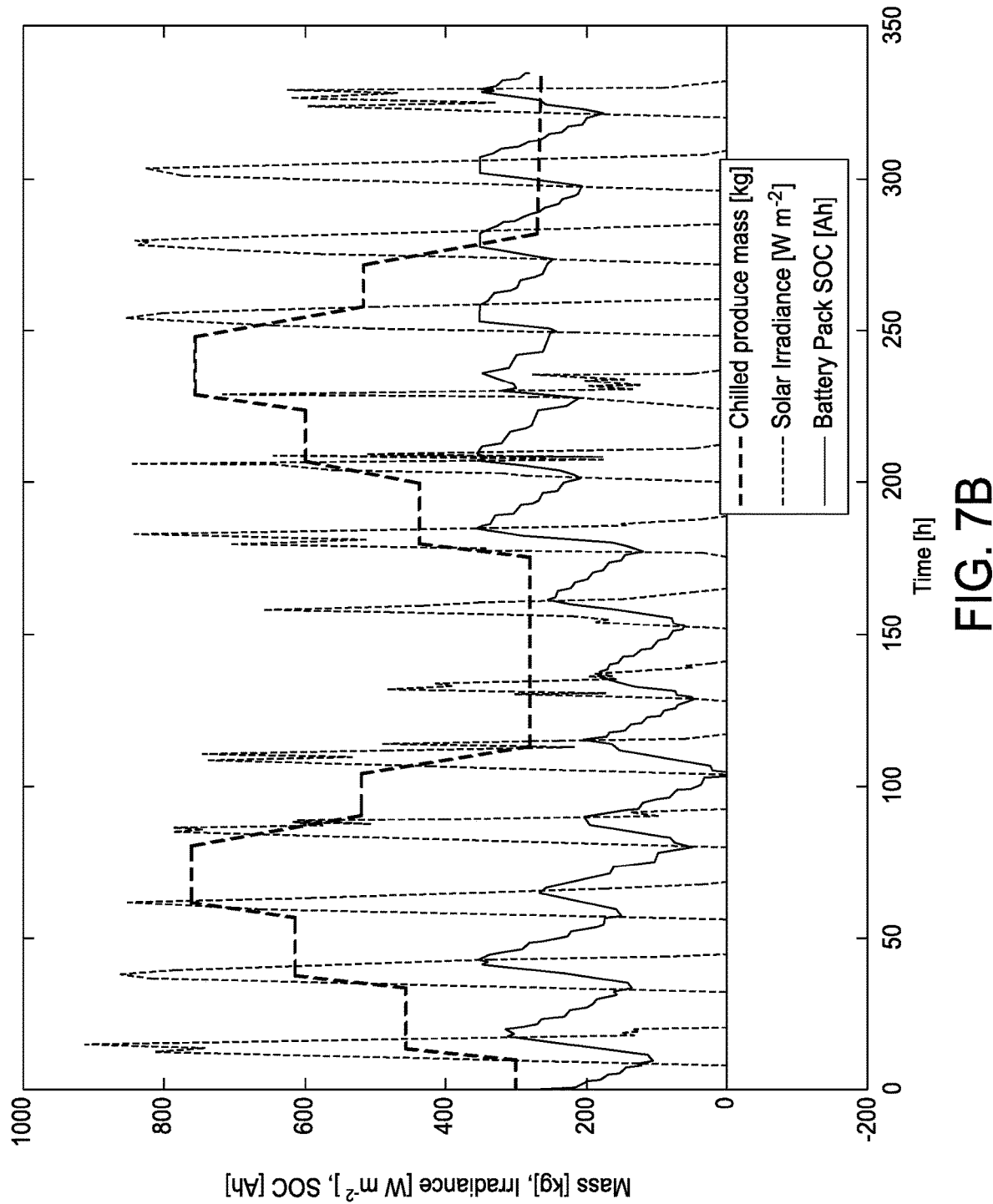
Figure 7B:
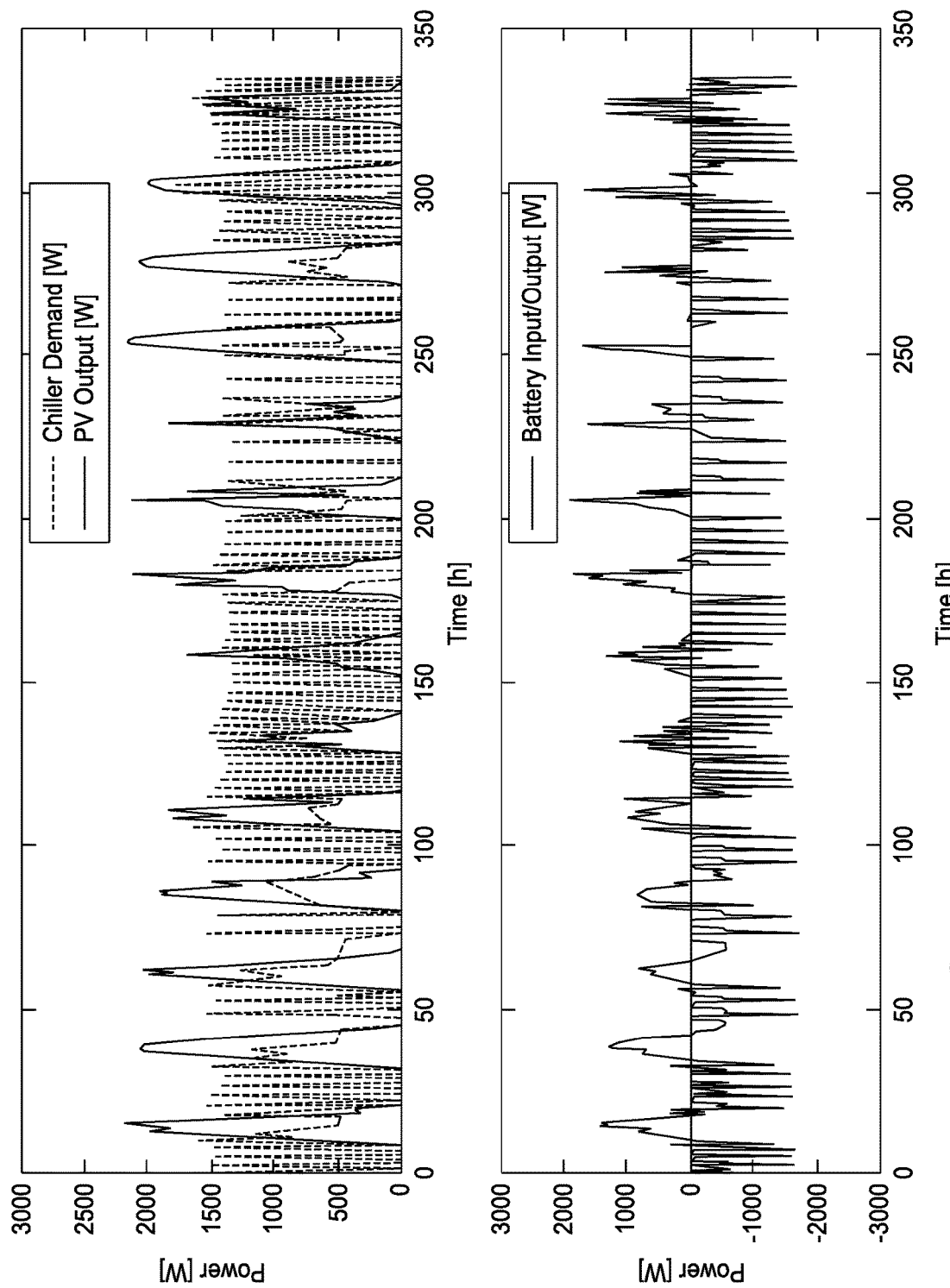

FIGS. 7A and 7B illustrate model simulated off-grid performance of a solar-powered refrigerated container with battery storage. FIG. 7A shows model simulated off-grid performance of a solar-powered refrigerated container with battery storage using typical controls. FIG. 7B shows model simulated off-grid performance of a solar-powered refrigerated container with battery storage control in accordance with embodiments of the present systems and methods using model-predictive control strategy. FIGS. 7A and 7B illustrate model simulated off-grid performance during two weeks of operation of a dynamic fresh produce storage operation for fresh produce storage during operation in a typical two weeks of early fall in Golden, CO Left column shows transient plots of produce mass (kg) in cold-storage space, solar irradiance (W m-2) on PV panels, and battery state of charge state-of-charge (SOC in Amp-hours with max capacity of 350 Amp-hours). Plots in right column show power output of the 12-panel PV array [kW], dynamic power demand of chiller compressor and fans of the refrigeration unit [kW], and rate of energy flow [kW] into or out of the charge controller for the battery pack. FIG. 7A shows typical controls where the battery energy management system raises the refrigeration minimum and maximum temperature set points by 1° C. from 3° C. and 5° C. to 4° C. and 6° C. respectively when the battery state of charge <20% of capacity. FIG. 7B shows use of the present model-predictive controls that raises the refrigeration minimum and maximum temperature set points from 3° C. and 5° C. to 4° C. and 6° C. based on model prediction indicating inadequate battery state-of-charge (from model in a) and adjusting setpoint earlier to sustain adequate battery state-of-charge throughout period of operation.

In various embodiments, solar panels provide electric power during periods of solar insolation. Battery packs provide electrical energy storage during periods of excess solar power and provide electrical energy release during periods of no or inadequately low solar insolation. Power electronics may regulate energy distribution to various loads including refrigeration unit compressor(s), evaporator fan(s), condenser fan(s), and fresh-air supply fan(s) as needed. Vapor compression cycle and supporting evaporator fan air circulation provide cooling in refrigerated storage container or stand-alone cold-storage room. Instrumentation may be provided for monitoring room temperatures, vapor compression cycle pressures, temperatures, and power demands, and battery voltage and state-of-charge. In various embodiments, the system includes the use of weather forecasting and real-time rapid model adaptation to update refrigeration controls to sustain full off-grid solar power operation. A wireless-network-connected local, purpose-built, computer, micro-processor, microcontroller, or the like, may accept and read standard-format local weather data such as may be Numerical Weather Prediction (NWP) data, data collected from a weather station, which may be, by way of example, disposed (mounted) on the outside of the refrigerated space 125, and/or the like. A wireless-network-connected remote computer communicates with the local processor to take in model may be engaged for simulating multiple days of container energy performance. This computer model may include the ability to run rapid optimization to evaluate thermal control settings to improve and preserve battery lifetime while sustaining the value of cold-storage by setting temperature setpoints and duty cycles of vapor compression cycle (in contrast to simply changing temperature setpoints). Optional components may include the use of phase-change materials inside the container for thermal energy storage to reduce demands on vapor compression cycle and, thus, reduce demands on the batteries so as to provide electric power during long-periods of no or inadequate solar insolation, which may be incorporated into models.

Figure 8:
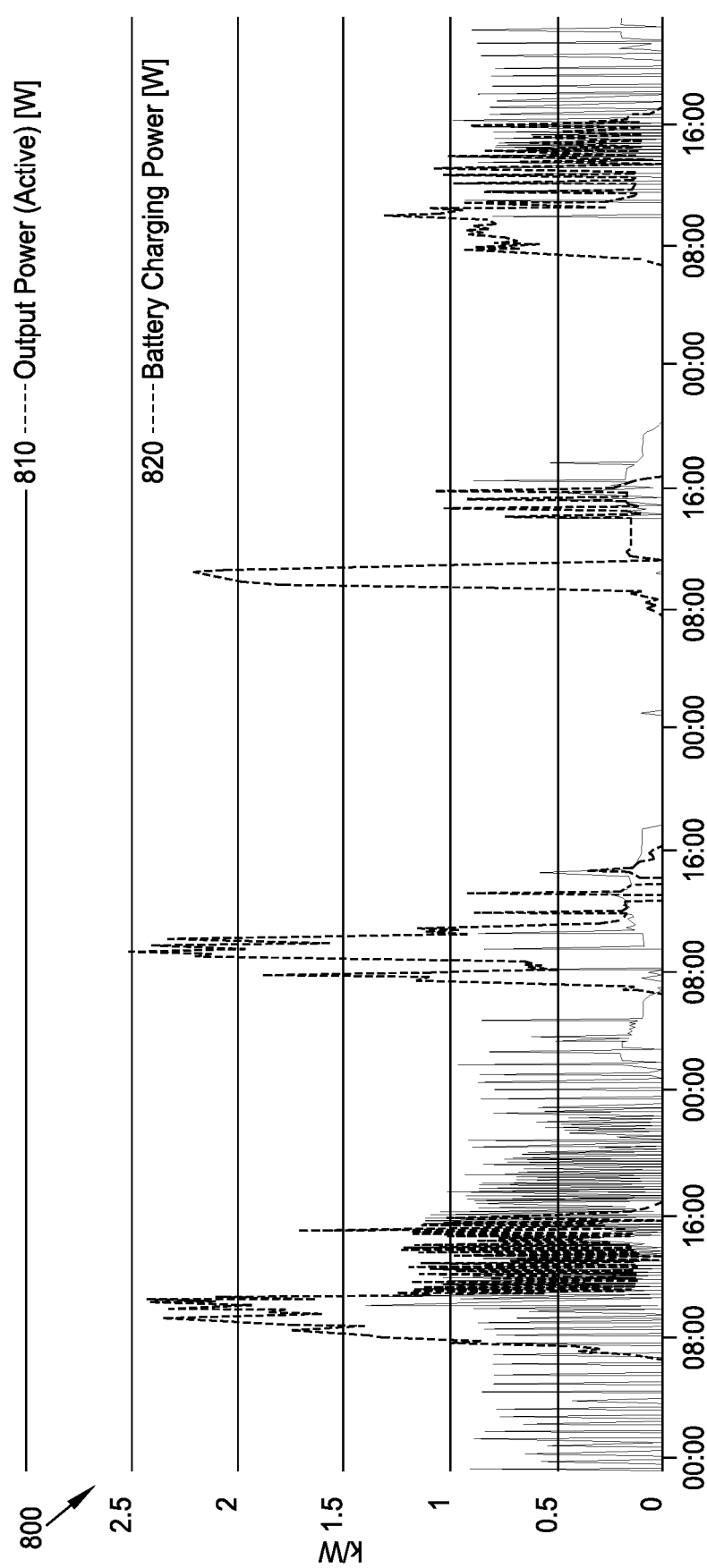
FIG. 8 is a graph of power consumed by the cooling equipment configured to regulate temperature in the cold storage space of the off-grid refrigerated facility, versus, the solar photovoltaic panel-produced electricity stored in the battery, over time, according to some embodiments.
Figure 9:
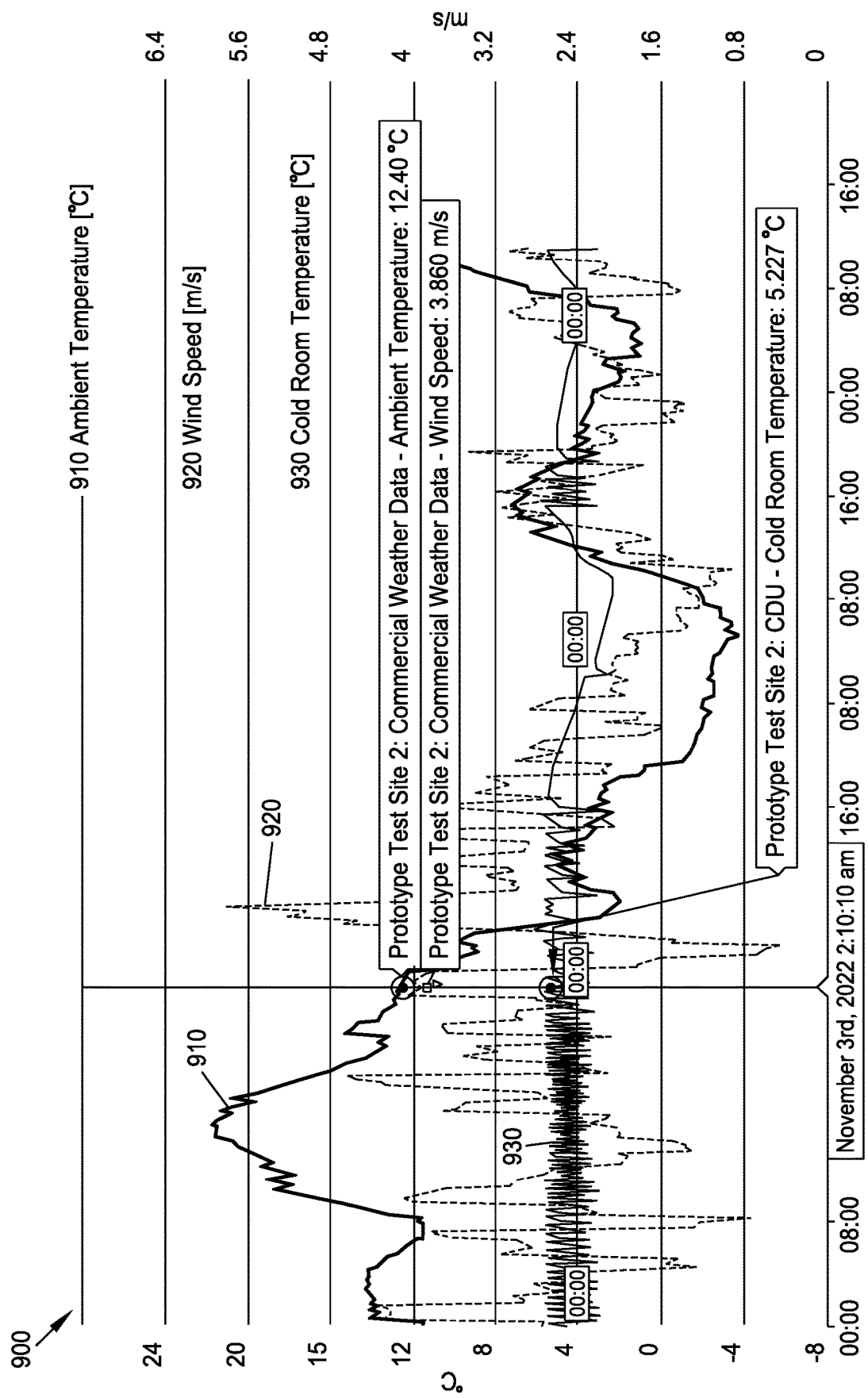
FIG. 9 is a graph showing the temperature in the cold storage space, versus, ambient temperature and ambient wind speed, over time, according to some embodiments.

FIGS. 8 and 9, below, are graphs of information that the edge controller (120) at the local off-grid refrigerated unit (100), local unit sends to the cloud, for use by (the computing data center (605) running) a high-fidelity model (610). The data shown in FIGS. 8 and 9 is from two days, one warm day, and one cool day.

FIG. 8 is graph 800 of power consumed 810 by the cooling equipment (105) configured to regulate temperature in the cold storage space (125) of the off-grid refrigerated facility (100), versus, the solar photovoltaic panel-produced electricity 820 stored in the battery (110), over a time frame of approximately three days, according to some embodiments. Power consumption curve 810 shows spikes because the off-grid refrigerated unit (100) heats up and the present system is keeping the temperature in the cold storage space (125) within a desired temperature band. Battery curve 820 shows charging of the battery (110) and shows, at the charging during the day when the solar power exceeds the power demand of the refrigeration unit and associated fans (810). This excess charge provides power stored to regulate temperature in the cold storage space (125) at night and during lower insolation.

FIG. 9 is graph 900 showing temperature 910 in the cold storage space (125), versus, ambient (outside) temperature 920 and ambient (outside) wind speed 930, over a time frame of approximately three and a half days, according to some embodiments. As shown therein, temperature 910 in the cold storage space (125) oscillates within a temperature ban during the first (warm) day warm as the cooling equipment (105) configured to regulate temperature in the cold storage space (125) of the off-grid refrigerated facility (100) turns on and off, and then, temperature 910 in the cold storage space (125) is maintained while the cold, cloudy weather comes in on second (cooler) day.

It should be understood that various operations described herein may be implemented in software executed by processing circuitry, hardware, or a combination thereof. The order in which each operation of a given method is performed may be changed, and various operations may be added, reordered, combined, omitted, modified, etc. It is intended that the invention(s) described herein embrace all such modifications and changes and, accordingly, the above description should be regarded in an illustrative rather than a restrictive sense.

Modules implemented in software for execution by various types of processors may, for instance, include one or more physical or logical blocks of computer instructions, which may, for instance, be organized as an object or procedure. Nevertheless, the executables of an identified module need not be physically located together but may include disparate instructions stored in different locations which, when joined logically together, include the module and achieve the stated purpose for the module. Indeed, a module of executable code may be a single instruction, or many instructions, and may even be distributed over several different code segments, among different programs, and across several memory devices. Similarly, operational data may be identified and illustrated herein within modules and may be embodied in any suitable form and organized within any suitable type of data structure. The operational data may be collected as a single data set or may be distributed over different locations including over different storage devices.

To implement various operations described herein, computer program code (i.e., instructions for carrying out these operations) may be written in any combination of one or more programming languages, including an object-oriented programming language such as Java, Smalltalk, Python, C++, or the like, conventional procedural programming languages, such as the "C" programming language or similar programming languages, or any of machine learning software. These program instructions may also be stored in a computer readable storage medium that can direct a computer system, other programmable data processing apparatus, controller, or other device to operate in a particular manner, such that the instructions stored in the computer readable medium produce an article of manufacture including instructions which implement the operations specified in the block diagram block or blocks. The program instructions may also be loaded onto a computer, other programmable data processing apparatus, controller, or other device to cause a series of operations to be performed on the computer, or other programmable apparatus or devices, to produce a computer implemented process such that the instructions upon execution provide processes for implementing the operations specified in the block diagram block or blocks.

In various embodiments, aspects of systems and methods described herein may be implemented, at least in part, using machine learning (ML). As used herein, the terms "machine learning" or "ML" refer to one or more algorithms that implement: a neural network (e.g., artificial neural network, deep neural network, convolutional neural network, recurrent neural network, autoencoders, reinforcement learning, etc.), fuzzy logic, artificial intelligence (AI), deep learning, deep structured learning hierarchical learning, support vector machine (SVM) (e.g., linear SVM, nonlinear SVM, SVM regression, etc.), decision tree learning (e.g., classification and regression tree or "CART"), Very Fast Decision Tree (VFDT), ensemble methods (e.g., ensemble learning, Random Forests, Bagging and Pasting, Patches and Subspaces, Boosting, Stacking, etc.), dimensionality reduction (e.g., Projection, Manifold Learning, Principal Components Analysis, etc.), or the like.

Non-limiting examples of publicly available machine learning algorithms, software, and libraries that may be utilized within embodiments of systems and methods described herein include, but are not limited to: PYTHON, OPENCV, INCEPTION, THEANO, TORCH, PYTORCH, PYLEARN2, NUMPY, BLOCKS, TENSORFLOW, MXNET, CAFFE, LASAGNE, KERAS, CHAINER, MATLAB Deep Learning, CNTK, MatConvNet (a MATLAB toolbox implementing convolutional neural networks for computer vision applications), DeepLearnToolbox (a Matlab toolbox for Deep Learning from Rasmus Berg Palm), BigDL, Cuda-Convnet (a fast C++/CUDA implementation of convolutional or feed-forward neural networks), Deep Belief Networks, RNNLM, RNNLIB-RNNLIB, matrbm, deeplearning4j, Eblearn.Ish, deepmat, MShadow, Matplotlib, SciPy, CXXNET, Nengo-Nengo, Eblearn, cudamat, Gnumpy, 3-way factored RBM and mcRBM, mPoT, ConvNet, ELEKTRONN, OpenNN, NEURALDESIGNER, Theano Generalized Hebbian Learning, Apache SINGA, Lightnet, and SimpleDNN."

The terms "tangible" and "non-transitory," as used herein, are intended to describe a computer-readable storage medium (or "memory") excluding propagating electromagnetic signals; but are not intended to otherwise limit the type of physical computer-readable storage device that is encompassed by the phrase computer-readable medium or memory. For instance, the terms "non-transitory computer readable medium" or "tangible memory" are intended to encompass types of storage devices that do not necessarily store information permanently, including, for example, RAM. Program instructions and data stored on a tangible computer-accessible storage medium in non-transitory form may afterwards be transmitted by transmission media or signals such as electrical, electromagnetic, or digital signals, which may be conveyed via a communication medium such as a network and/or a wireless link.

Reference is made herein to "configuring" a device or a device "configured to" perform some operation(s). It should be understood that this may include selecting predefined logic blocks and logically associating them. It may also include programming computer software-based logic of a retrofit control device, wiring discrete hardware components, or a combination of thereof. Such configured devices are physically designed to perform the specified operation(s).

Unless stated otherwise, terms such as "first" and "second" are used to arbitrarily distinguish between the elements such terms describe. Thus, these terms are not necessarily intended to indicate temporal or other prioritization of such elements. The terms "coupled" or "operably coupled" are defined as connected, although not necessarily directly, and not necessarily mechanically. The terms "a" and "an" are defined as one or more unless stated otherwise. The terms "comprise" (and any form of comprise, such as "comprises" and "comprising"), "have" (and any form of have, such as "has" and "having"), "include" (and any form of include, such as "includes" and "including") and "contain" (and any form of contain, such as "contains" and "containing") are open-ended linking verbs. As a result, a system, device, or apparatus that "comprises," "has," "includes" or "contains" one or more elements possesses those one or more elements but is not limited to possessing only those one or more elements. Similarly, a method or process that "comprises," "has," "includes" or "contains" one or more operations possesses those one or more operations but is not limited to possessing only those one or more operations.

Although the above embodiments have been described in language that is specific to certain structures, elements, compositions, and methodological steps, it is to be understood that the technology defined in the appended claims is not necessarily limited to the specific structures, elements, compositions and/or steps described. Rather, the specific aspects and steps are described as forms of implementing the claimed technology. Since many embodiments of the technology can be practiced without departing from the spirit and scope of the invention, the invention resides in the claims hereinafter appended.

What is claimed is:

1. A thermal and environmental control system, comprising:
an off-grid storage facility comprising:
cooling equipment configured to regulate temperature in a cold storage space of an off-grid refrigerated facility;
one or more solar photovoltaic panels configured to produce electricity;
a battery in operable connection with the one or more solar photovoltaic panels and configured to:
store the electricity produced by the one or more solar photovoltaic panels; and
provide electrical power to the cooling equipment during periods of no solar insolation and periods of solar insolation insufficient for the one or more solar photovoltaic panels to power the cooling equipment; and
a local computer processor at the off-grid storage facility, the computer processor in operable connection with the cooling equipment, the computer processor configured to provide a regulating signal to the cooling equipment for maintaining battery state-of-charge above an adjustable lower limit, maintaining one or more adjustable thermal setpoints, and maintaining adjustable environmental conditions such as humidity and/or contaminant gas concentration; and
a cloud-based computing system in operable communication to weather data and in operable communication with the local computer processor, the cloud-based computing system configured to compute, based at least in part on current measured and forecasted weather data, at least one selected from preferred setpoints and optimized thermal setpoints for maintaining quality of cold storage in the off-grid storage facility and sustaining battery state-of-charge above the desired lower limit, and maintaining the predetermined environmental conditions.

2. The system of claim 1, wherein the cloud-based computing system further comprises a cold-storage-system reduced-order model configured to run backward in time to compare with performance for model parameter adjustment and to run forward in time to provide temperature, ventilation, and/or battery energy management setting adjustments in response to weather forecasts and expected solar incidence in order to ensure reliable off-grid performance with adequate battery state-of-charge.

3. The system of claim 1, wherein the cloud-based computing system further comprises a cold-storage reduced-order model and a meta-model of the stored goods configured to:
evaluate loss of storage life of cold-storage goods; and
make an update to at least one of the regulating temperature, ventilation, and battery energy management settings, based, at least in part on the loss of life of cold-storage goods, the update comprising at least one of (1) the one or more adjustable setpoints to maintain an internal temperature, (2) a humidity level, and (3) a contaminant gas concentration by controlling at least one of cooling-unit power demand and fresh-air supply to the cold storage space, so as to maintain electrical operation of the off-grid storage facility while minimizing loss of storage life of the cold-storage goods.

4. The system of claim 1, wherein the cloud-based computing system further comprises an adaptive reduced-order model that simulates recent past refrigerated adjusts key model parameters to update the model to simulate recent system performance including solar panel electric power production, refrigeration unit power demands and duty cycles, cold energy storage temperature distribution, and battery state-of-charge change.

5. The system of claim 1, wherein an optimized battery usage, the one or more adjustable thermal setpoints, and the adjustable environmental condition setpoints further comprise fresh air fan control, and the one or more adjustable thermal setpoints and fan control are selected together, by the cloud-based computing system with a stored-goods meta-model, to minimize loss of storage life of cold-storage goods.

6. The system of claim 1, wherein the off-grid storage facility further comprises a humidity sensor disposed in the cold storage space and an optimized battery usage, the one or more adjustable thermal setpoints, and the adjustable environmental conditions setpoint further comprise humidity sensor and control setpoint, and the thermal setpoint and humidity setpoint are selected together to minimize loss of storage life of the cold-storage goods by adjusting fresh air supplies to the cold storage space to humid air with dryer fresh air.

7. The system of claim 1, wherein an optimized battery usage, the one or more adjustable thermal setpoints, and the adjustable environmental conditions setpoint further comprise at least one of a carbon dioxide and hydrocarbon concentration setpoints to determine a controlled fresh air supply, and at least one of the thermal setpoint and carbon dioxide and hydrocarbon concentration setpoints are selected together to minimize loss of storage life of the cold-storage goods by adjusting fresh air supplies to the unit to displace internal carbon-dioxide or hydrocarbon-laden air.

8. The system of claim 1, further comprising phase-change material panels disposed in the cold storage space and configured to:
capture thermal energy to provide cold-temperature storage during operation of the cooling equipment during periods of excess solar power and full battery state-of-charge; and
provide internal temperature stabilization in the cold storage space at determined cold storage space temperatures and reduce battery discharge during periods of low solar insolation.

9. The system of claim 8, wherein the phase-change materials comprise a pumped phase-change solution to be pumped around determined locations in the cold storage space to:
- capture thermal energy to provide cold-temperature storage during operation of the cooling equipment during periods of excess solar power and full battery state-of-charge; and
- provide internal temperature stabilization in the cold storage space at the determined cold storage space temperatures and reduce battery discharge during periods of low solar insolation.

10. The system of claim 9, wherein the cloud-based computing system further comprises an adaptive model algorithm that controls electric power for pumping of the phase-change solution by incorporating the pumped phase change material heat transfer into the adaptive model algorithm.

11. A thermal and environmental control method for an off-grid cold-storage facility comprising:
- regulating temperature in a cold storage space of an off-grid refrigerated facility using cooling equipment;
- producing electricity using one or more solar photovoltaic panels;
- storing the electricity produced by the one or more solar photovoltaic panels in a battery in operable connection with the one or more solar photovoltaic panels;
- providing electrical power to the cooling equipment during periods of no solar insolation and periods of solar insolation insufficient for the one or more solar photovoltaic panels to power the cooling equipment;
- providing a regulating signal to the cooling equipment for maintaining battery state-of-charge above a set lower limit, maintaining one or more adjustable thermal setpoints, and maintaining one or more adjustable environmental conditions setpoints using a local computer processor at the off-grid storage facility that is in operable connection with the cooling equipment; and
- through a wireless-network and a remote computer, running a reduced-order model of the cold-storage facility calibrated with recent facility performance derived from instrumentation and weather data and evaluating with forecasted weather data, preferred thermal setpoints for maintaining quality of cold storage in the off-grid storage facility and sustaining battery state-of-charge above a desired lower limit, and maintaining the predetermined environmental conditions, by a cloud-based computing system in operable communication to weather data and in operable communication with the local computer processor.

12. The method of claim 11, wherein the cloud-based computing system further comprises a meta-model for the life of the stored goods, providing forward-based adjustments to thermal setpoints and environmental setpoints in response to weather forecasts and expected solar incidence while maintaining battery state-of-charge above a desired lower limit.

13. The method of claim 11, further comprising the cloud-based computing system further evaluating loss of storage life of cold-storage goods and making an update to the regulating signal, based, at least in part on the loss of life of cold-storage goods, the update comprising the one or more adjustable thermal setpoints to maintain a temperature, and adjustable environmental conditions setpoing controlling fresh-air supply to the cold storage, so as to maintain electrical operation of the off-grid storage facility while minimizing loss of storage life of the cold-storage goods.

14. The method of claim 11 further comprising adjusting key model parameters, in an adaptive model algorithm of the cloud-based computing system, to update the model by calibrating modeled performance with past system performance including solar panel electric power production, refrigeration unit power demands and duty cycles, cold-storage space temperature distribution, and evolution of battery state-of-charge.

15. The method of claim 11, wherein an optimized battery usage, the one or more adjustable thermal setpoints, and adjustable environmental conditions setpoints further comprise fresh air fan control, and the method further comprises selecting the one or more adjustable thermal setpoints and the fan control together, by the cloud-based computing system, minimizing loss of storage life of cold-storage goods based on a meta-model of the stored goods.

16. The method of claim 11, wherein the off-grid storage facility further comprises a humidity sensor disposed in the cold storage space and an optimized battery usage, the one or more adjustable thermal setpoints, and adjustable environmental conditions setpoints further comprise humidity sensor and a control setpoint, and the method further comprises selecting the thermal setpoint and the humidity setpoint together to minimize loss of storage life of the cold-storage goods by adjusting fresh air supplies to the cold storage space to displace humid air with dryer fresh air.

17. The method of claim 11, wherein an optimized battery usage, the one or more adjustable thermal setpoints, and adjustable environmental conditions setpoints further comprise at least one of a carbon dioxide and hydrocarbon setpoint to determine a controlled fresh air supply, and the method further comprises selecting the thermal setpoint and at least one of the carbon dioxide and hydrocarbon setpoints together to minimize loss of storage life of the cold-storage goods by adjusting fresh air supplies to the unit to displace internal carbon-dioxide or hydrocarbon-laden air.

18. The method of claim 11, further comprising:
- capturing thermal energy using phase-change material panels disposed in the cold storage space to provide cold-temperature storage during operation of the cooling equipment during periods of excess solar power and full battery state-of-charge; and
- providing internal temperature stabilization in the cold storage space, using the phase-change material panels disposed in the cold storage space, at determined cold storage space temperatures and reducing battery discharge during periods of low solar insolation.

19. The method of claim 18, wherein the phase-change materials comprise a pumped phase-change solution and the method further comprises pumping the phase-change solution around determined locations in the cold storage space capturing thermal energy to provide cold-temperature storage during operation of the cooling equipment during periods of excess solar power and full battery state-of-charge and providing internal temperature stabilization in the cold storage space at the determined cold storage space temperatures and reduce battery discharge during periods of low solar insolation.

20. The method of claim 19, wherein the cloud-based computing system further comprises an adaptive model algorithm controlling electric power for pumping of the phase-change solution by incorporating the pumped phase change material heat transfer into the adaptive model algorithm.

* * * * *